United States Patent [19]

Fagouri et al.

[11] Patent Number: 6,080,929
[45] Date of Patent: Jun. 27, 2000

[54] STABILIZED FILLER COMPOSITIONS FOR CABLE AND WIRE

[75] Inventors: Christopher John Fagouri, Jarrettsville, Md.; Robert Scott Archibald, Thomaston, Conn.

[73] Assignee: Uniroyal Chemical Company, Inc., Middlebury, Conn.

[21] Appl. No.: 09/047,697

[22] Filed: Mar. 25, 1998

[51] Int. Cl.[7] .......................... H02G 15/20; H02G 15/00; C08K 5/38

[52] U.S. Cl. ................ 174/23 C; 174/25 C; 174/121 A; 174/140 C; 523/173; 524/202; 524/203; 524/255; 524/257

[58] Field of Search ..................... 508/128, 130; 174/121 A, 140 C, 23 C, 25 C; 524/202, 203, 255, 257; 523/173

[56] References Cited

U.S. PATENT DOCUMENTS

| | | | |
|---|---|---|---|
| 2,789,962 | 4/1957 | Groff | 524/203 |
| 3,156,728 | 11/1964 | Orloff | 524/255 |
| 3,255,136 | 6/1966 | Becker et al. | 260/23 |
| 3,452,056 | 6/1969 | Sundholm | 260/390 |
| 3,505,225 | 4/1970 | Wheeler | 252/33.6 |
| 3,733,427 | 5/1973 | Clark et al. | 174/23 C |
| 3,856,980 | 12/1974 | Puckowski et al. | 174/23 C |
| 3,893,962 | 7/1975 | Walton et al. | 523/173 |
| 4,190,570 | 2/1980 | Kaufman et al. | 260/33.6 |
| 4,218,577 | 8/1980 | Bahder et al. | 174/23 C |
| 4,221,696 | 9/1980 | Cook et al. | 260/42.46 |
| 4,246,435 | 1/1981 | Thomapson | 174/23 C |
| 4,414,132 | 11/1983 | Goodall et al. | 502/169 |
| 4,493,943 | 1/1985 | Sato et al. | 174/23 C |
| 4,797,511 | 1/1989 | Capolupo et al. | 174/110 |
| 4,870,117 | 9/1989 | Levy | 174/23 C |
| 5,285,513 | 2/1994 | Kaufman et al. | 523/173 |
| 5,672,640 | 9/1997 | Brauer | 523/173 |
| 5,728,754 | 3/1998 | Lakshmanan et al. | 523/173 |
| 5,737,469 | 4/1998 | Costello et al. | 523/173 |

FOREIGN PATENT DOCUMENTS

| | | | |
|---|---|---|---|
| 0605000A1 | 6/1994 | European Pat. Off. | H01B 3/44 |
| 0675508B1 | 3/1997 | European Pat. Off. | H01B 7/28 |

OTHER PUBLICATIONS

ASTM Designation: D 4732–93, Standard Specification for Cool–Application Filling Compounds for Telecommunications Wire and Cable, p. 431.

ASTM Designation: D 3895–94, "Standard Test Method for Oxidative–Induction Time of Polyolefins by Differential Scanning Calorimetry," pp. 441–444.

*Atmospheric Oxidation and Antioxidants*—ed. Gerald Scott, pp. 188–207, 217, 248–273, 353–361, 370, 371, Elsevier Pub. Co., N.Y., 1965.

*Primary Examiner*—Veronica P. Hoke
*Attorney, Agent, or Firm*—Raymond D. Thompson; Paul Grandinetti

[57] ABSTRACT

The present invention is directed to an improvement in a wire or cable system comprising a wire or cable portion, an insulation composition surrounding the wire or cable portion, a filler material surrounding the insulation composition and a jacket composition surrounding the filler material wherein either the insulation composition, the jacket composition, or both comprise at least one antioxidant, wherein the improvement comprises the inclusion in the filler material of a stabilizing mixture comprising at least two antioxidants, selected from at least two members of the group consisting of:

(a) metal dithiocarbamate salts,
(b) amine antioxidants, and
(c) sterically hindered phenolic antioxidants, wherein the stabilizing mixture is present in the filler material in an amount that is effective for the reduction of the oxidation of the cable filling material, thereby reducing deterioration of the jacket and/or insulation.

35 Claims, No Drawings

STABILIZED FILLER COMPOSITIONS FOR CABLE AND WIRE

BACKGROUND OF THE INVENTION

1. Field of the Invention

The present invention is directed to stabilized cable filler compositions for cable and wire.

2. Description of Related Art

For certain uses, cable and wire are surrounded by an insulation layer, which, in turn, is surrounded by filler compositions that, in turn, are surrounded by jacket compositions. Such filler compositions, when employed, should possess physical properties that are desirable for the given use.

A typical telephone cable is constructed of twisted pairs of metal conductors for signal transmission. Each conductor is insulated with a polymeric material. The desired number of transmission pairs is assembled into a circular cable core, which is protected by a cable sheath incorporating metal foil and/or armor in combination with a polymeric jacketing material. The sheathing protects the transmission core against mechanical and, to some extent, environmental damage.

Telecommunication cable, whether of the metallic or fiber optic variety, is frequently employed where water, as a result of jacket deterioration, can pass through openings in the jacket and thereafter migrate through the filler component to the insulation layer of the cable system.

However, water entry into either metal conductor or fiber optic cables may be undesirable for several reasons. For example, such water entry may lead to deterioration of cable transmission properties owing to corrosion, particularly where cable end portions are spliced together. In order to protect such cables, it has become common practice to encase certain of their segments in an enclosure that acts as an extension of the cable sheath or cover. It has also become common practice to encapsulate the enclosed cable segment with a curable encapsulant in order to prevent water immigration. Sealants for this purpose are disclosed in U.S. Pat. No. 4,221,696.

Grease-filled telephone cables were developed in order to minimize the risk of water penetration, which can severely upset electrical signal transmission quality. Here, a hydrocarbon filler grease is used to provide a watertight cable by filling the air spaces in the cable interstices. Although the cable filler grease will extract a portion of the antioxidants from the insulation and/or jacket layers, the watertight cable will not exhibit premature oxidative failure as long as the cable maintains its integrity.

In the cable transmission network, however, junctions of two or more watertight cables are required and this joining is often accomplished in an outdoor enclosure known as a pedestal (an interconnection box). Inside the pedestal, the cable sheathing is removed, the cable filler grease is wiped off, and the transmission wires are interconnected. At this point, the pedestal now has exposed insulated wires that are often subjected to high temperatures, air, and/or moisture. This environment, combined with the reduction in antioxidant levels in the insulation and jacket layers brought about by extraction into the filler layer, can cause the insulation in the pedestal to exhibit premature oxidative failure. This failure can then cause embrittlement of the insulation and jacket layers, making them prone to cracking and flaking, which can cause a loss of electrical transmission performance.

High levels of antioxidants could be used in the polymeric insulation and jacket layers, but this would alter the performance characteristics of the insulation and would be undesirable economically owing to the cost of the antioxidants. Thus, there is a need for antioxidants capable of resisting extraction by the filler layer to the extent necessary to prevent oxidative failure and help ensure a 30 to 40 year service life.

U.S. Pat. No. 3,255,136 discloses stabilizer compositions said to be useful in the stabilization of polypropylene against degradative deterioration in physical properties as a result of exposure to light and air, particularly at elevated temperatures, and over long periods of time. The stabilizer system comprises three stabilizers, namely, an organic mono- or polyhydric phenol, an organic phosphite, and a thiodipropionic acid ester. According to the patent, this stabilizer system not only improves the resistance of the polymer to discoloration and embrittlement upon exposure to air and light at normal atmospheric and elevated temperatures, particularly over long periods of time, but also improves the resistance of the polymer to reduction in melt viscosity when worked at elevated temperatures in the presence of oxygen.

U.S. Pat. No. 4,190,570 discloses a waterproof filling and flooding composition for communication cables that comprises 90 percent or more by weight of petrolatum, about 5 to 7 percent polybutene-1, 0.5 to 2.0 percent polyethylene, and the remainder an amorphous saturated rubber, such as ethylenepropylene rubber (EPR), which is said to exhibit flow resistance at temperatures of 160° to 170° F. and even higher.

EP 0 675 508 B1 discloses a grease-filled cable construction that contains an antioxidant that is said to resist extraction so that it can be maintained in cable insulation at a satisfactory stabilizing level. The disclosure of this publication is hereby incorporated herein by reference.

In the wire and cable industry, extended thermoplastic rubber (ETPR) and petroleum jelly/polyethylene are often incorporated into the filler component to effect water protection of the insulation layer. Examples of cable segments that are often placed in enclosures and thereafter encapsulated include:

(1) the regions where two or more cables are spliced together;

(2) the ends, or end block portions, of the cable; and (3) the junctions between air-pressurized cable and hydrocarbon grease-filled cable, or pressure block.

One problem that arises, occurring when an antioxidant ingredient of the insulation or jacket layers is extracted from the insulation or jacket layers and incorporated into the filler, is that the wire and cable product is left unsuitable for its intended purpose, principally because of deterioration of the jacket and/or insulation layers.

In general, to stabilize the filler component of cable and wire, at least one antioxidant ingredient is conventionally incorporated into the filler composition. Similarly, to stabilize the insulation and jacket components, at least one other antioxidant, usually different from the filler antioxidant, is incorporated into the jacket composition.

In this regard, conventional stabilizers for polyolefin-based filler components of commercial cable and wire systems include organic phosphites, which may be combined with such polyhydric phenols as BHT and BHA, as are disclosed in U.S. Patent 4,190,570, supra.

One aspect or feature of the present invention involves waterproof, high-performance, cost-efficient stabilizer systems for filler components of conventional wire and cable systems, a result of this invention.

Such waterproof compositions may, indeed, be deemed indispensable in protecting those communication cables that are manufactured mainly from hydrocarbon materials.

SUMMARY OF THE INVENTION

One stabilizer, conventionally employed for wire and cable filler, is thiodiethylene bis(3,5-di-t-butyl-4-hydroxyhydrocinnamate), which, as a specialty product, commands a premium price. Its performance, in connection with a typical use, is measured by Oxygen Induction Time (OIT), a standard set forth, e.g., in ASTM Method D 3895-94. It has now been discovered that certain antioxidants, stabilizers, and combinations thereof that have demonstrated usefulness in applications other than wire and cable fillers also exhibit a stabilization quality superior to that of thiodiethylene bis(3,5-di-t-butyl-4-hydroxyhydrocinnamate).

One such stabilizer is a metal dialkyl- or diaryl dithiocarbamate salt, such as zinc dibutyl dithiocarbamate, previously used in connection with wire jacketing, but not in connection with the filler.

In particular, the antioxidants, stabilizers, and combinations of the present invention have been found to provide wire and cable protection at substantially lower loading values, resulting in lower cost to users. It is therefore a general object of the present invention to provide a composition that is capable of stabilizing the filler component of cable and wire without resulting in deterioration of the insulation or jacket. In addition, the present invention also provides the capability of improving the protection of the insulation, jacket, or other plastic material in contact with the cable filling material.

Yet another object is to provide such a stabilizer composition that is more effective than those used conventionally and, at the same time, costs less.

Other objects, features, and advantages of the present invention will be readily understood by those skilled in the prior art upon reading the following detailed description.

In connection with the present invention, a conventional prior art cable system is characterized as including a cable or wire portion coated with an insulation layer, a filler material surrounding the insulation layer, and a jacket composition surrounding the filler material, wherein the insulation and/or the jacket comprises at least one antioxidant.

The present invention is characterized in that the filler material of the cable system includes a stabilizing mixture comprising at least two components. One component can be selected from the group consisting of a metal dialkyl dithiocarbamate salt, a metal diaryl dithiocarbamate salt, and combinations thereof. Another component can be an amine antioxidant, such as polymerized 1,2-dihydro-2,2,4-trimethyl quinoline, a complex diarylamine-ketone reaction product with N,N'-diphenyl-para-phenylene diamine, a diarylamine, or a combination of these. Still another component can be a phenolic antioxidant, such as tetrakis {methylene(3,5-di-t-butyl-4-hydroxy-hydrocinnamate) }methane. In other words, the present invention is directed to filler layers comprising at least two antioxidants each chosen from at least two separate groupings of the above-described three groupings of components.

The present invention is further characterized in that the stabilizing mixture is present in the filler material in an amount that is effective for the reduction of the oxidation of the cable filling material, thereby reducing deterioration of the jacket and/or insulation.

More particularly, the present invention is directed to an improvement in a wire or cable system comprising a wire or cable portion, an insulation composition surrounding the wire or cable portion, a filler material surrounding the insulation composition and a jacket composition surrounding the filler material wherein either the insulation composition, the jacket composition, or both comprise at least one antioxidant, wherein the improvement comprises the inclusion in the filler material of a stabilizing mixture comprising at least two antioxidants, selected from at least two members of the group consisting of:

is (a) metal dithiocarbamate salts, (b) amine antioxidants, and (c) sterically hindered phenolic antioxidants, wherein the stabilizing mixture is present in the filler material in an amount that is effective for the reduction of the oxidation of the cable filling material, thereby reducing deterioration of the jacket and/or insulation.

DESCRIPTION OF THE PREFERRED EMBODIMENTS

As mentioned above, the present invention is characterized in that the filler material includes a stabilizing mixture comprising at least two components.

One of the at least two components can be selected from the group consisting of at least one metal dithiocarbamate salt of the structure

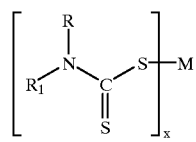

wherein

M is a divalent, trivalent, or tetravalent metal,

X is an integer of from 2 to 4 that equals the valence of M, and the moiety

is the residue of any secondary amine that will react with carbon disulfide to form a dithiocarbamate.

In the above structural formula for the metal dithiocarbamate salts that are used in the practice of the present invention, R and $R_1$ are hydrocarbon groups, for example, aryl or alkyl, that can be the same or different, and they can be joined through a methylene group or through an oxygen or sulfur atom to form, with the nitrogen, a heterocyclic ring, The hydrocarbon groups can be alkyl groups having from 1 to 12 carbon atoms, cycloalkyl groups, and hydrocarbon-substituted cycloalkyl groups having from 5 to 12 carbon atoms, or aryl, aralkyl, or alkaryl groups having from 6 to 12 carbon atoms. Joined together, the groups R and $R_1$ may form, with the nitrogen, heterocyclic rings containing four to five carbon atoms, zero to one oxygen atom, and zero to one sulfur atom. The total number of carbon atoms in the groups R and $R_1$ (attached to the same nitrogen atom) is preferably 48 or less. Typical radicals in the amine groups include, but are not limited to, phenyl, naphthyl, methyl, ethyl, propyl, butyl, pentyl, hexyl, heptyl, octyl, cyclopentyl, cyclohexyl, benzyl, phenethyl, and the like. The amine nitrogen can be included in, for example, morpholino, thiamorpholino, and piperidino groups. The foregoing terms should be understood to be generic in the sense of including structural isomers where appropriate, for example, isopropyl, t-butyl, neopentyl, 2-ethylhexyl, and the like.

The metal, M, is preferably selected from the group consisting of the divalent metals copper, zinc, manganese, nickel, lead, cadmium, cobalt, tin(II), barium, and mercury, the trivalent metals iron(III) and bismuth, and the tetravalent metal tin(IV). It is preferred that M be a divalent metal, and more preferred that it be zinc. It is most preferred that this stabilizer be zinc diphenyldithiocarbamate or zinc dibutyldithiocarbamate.

That particular metal dialkyl or diaryl dithiocarbamate salt used in the practice of the present invention may advantageously be one of a family of compounds commercially available from Uniroyal Chemical Company, Inc., of Middlebury, Conn.

In this regard, preferred metal dialkyl and diaryl dithiocarbamate salts may be represented by the trade names Methazate® zinc dithiocarbamate salt (wherein R and $R_1$ are methyl), Ethazate® zinc dithiocarbamate salt (wherein R and $R_1$ are ethyl), Butazate® zinc dithiocarbamate salt (wherein R and $R_1$ are butyl), and Arazate® zinc dithiocarbamate salt (wherein R and $R_1$ are phenyl). These dialkyl and diaryl dithiocarbamates are known in the art as being fast-curing accelerators, active at low temperatures. They are also known as being non-staining and non-discoloring.

Arazate® zinc dithiocarbamate salt is especially recommended for use in connection with latex for adhesives, dipped goods, and other latex compounds requiring frequent replenishing.

Further in this regard, the Butazate® zinc dithiocarbamate salt is used not only in connection with latex compounding but also as an ultra-accelerator for nitrile rubber and EPDM compounds.

Similarly, Ethazate® zinc dithiocarbamate salt is also used in connection with latex compounding, especially for latex foam, dipped goods, and fabric coatings.

Also in this regard, Methazate® zinc dithiocarbamate salt is used in connection with wire insulation and jacket compositions, dipped goods, latex compounds, cements, footwear, and various molded goods.

One of the at least two components that can be used in the practice of the present invention can be an amine antioxidant. The amine antioxidants can be diarylamines, especially hydrocarbon substituted diarylamines, such as aryl, alkyl, alkaryl, and aralkyl substituted diphenylamine antioxidant materials. A nonlimiting list of commercially available hydrocarbon substituted diphenylamines includes substituted octylated, nonylated, and heptylated diphenylamines and para-substituted styrenated or α-methyl styrenated diphenylamines. The sulfur-containing hydrocarbon substituted diphenylamines, such as p-(p-toluenesulfonylamido)-diphenylamine, are also considered as part of this class.

Hydrocarbon-substituted diarylamines that are useful in the practice of this invention can be represented by the general formula

wherein Ar and Ar' are independently selected aryl radicals, at least one of which is preferably substituted with at least one alkyl radical. The aryl radicals can be, for example, phenyl, biphenyl, terphenyl, naphthyl, anthryl, phenanthryl, and the like. The alkyl substituent(s) can be, for example, methyl, ethyl, propyl, butyl, pentyl, hexyl, heptyl, octyl, nonyl, decyl, isomers thereof, and the like.

Preferred hydrocarbon-substituted diarylamines are those disclosed in U.S. Pat. Nos. 3,452,056 and 3,505,225, the disclosures of which are hereby incorporated herein by reference. The preferred hydrocarbon-substituted diarylamines can be represented by the following general formulas:

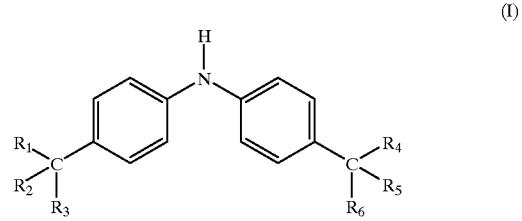
(I)

wherein $R_1$ is selected from the group consisting of phenyl and p-tolyl radicals;

$R_2$ and $R_3$ are independently selected from the group consisting of methyl, phenyl, and p-tolyl radicals;

$R_4$ is selected from the group consisting of methyl, phenyl, p-tolyl, and neopentyl radicals;

$R_5$ is selected from the group consisting of methyl, phenyl, p-tolyl, and 2-phenylisobutyl radicals; and, $R_6$ is a methyl radical.

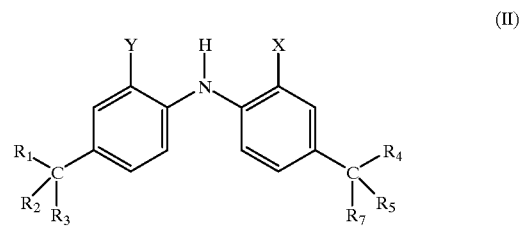
(II)

wherein $R_1$ through $R_5$ are independently selected from the radicals shown in Formula I and $R_7$ is selected from the group consisting of methyl, phenyl, and p-tolyl radicals;

X is a radical selected from the group consisting of methyl, ethyl, $C_3$–$C_{10}$ sec-alkyl, α,α-dimethylbenzyl, α-methylbenzyl, chlorine, bromine, carboxyl, and metal salts of the carboxylic acids where the metal is selected from the group consisting of zinc, cadmium, nickel, lead, tin, magnesium, and copper; and, Y is a radical selected from the group consisting of hydrogen, methyl, ethyl, $C_3$–$C_{10}$ sec-alkyl, chlorine, and bromine.

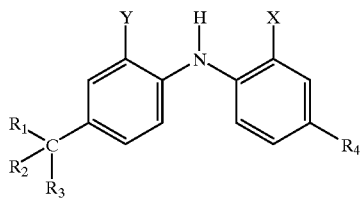
(III)

wherein
- $R_1$ is selected from the group consisting of phenyl or p-tolyl radicals;
- $R_2$ and $R_3$ are independently selected from the group consisting of methyl, phenyl, and p-tolyl radicals;
- $R_4$ is a radical selected from the group consisting of hydrogen, $C_3$–$C_{10}$ primary, secondary, and tertiary alkyl, and $C_3$–$C_{10}$ alkoxyl, which may be straight chain or branched; and
- X and Y are radicals selected from the group consisting hydrogen, methyl, ethyl, $C_3$–$C_{10}$ sec-alkyl, chlorine, and bromine.

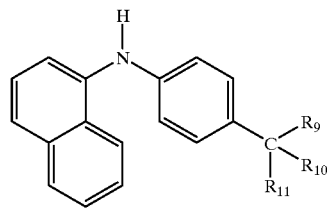
(IV)

wherein
- $R_9$ is a radical selected from the group consisting of methyl, phenyl, and p-tolyl;
- $R_{10}$ is a radical selected from the group consisting of methyl, phenyl, p-tolyl and 2-phenyl isobutyl; and
- $R_{11}$ is a radical selected from the group of consisting methyl, phenyl, and p-tolyl.

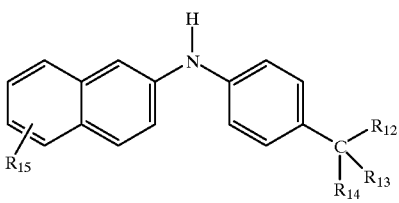
(V)

wherein
- $R_{12}$ is a radical selected from the group consisting of methyl, phenyl, and p-tolyl;
- $R_{13}$ is a radical selected from the group consisting of methyl, phenyl, and p-tolyl;
- $R_{14}$ is a radical selected from the group consisting of methyl, phenyl, p-tolyl, and 2-phenylisobutyl; and
- $R_{15}$ is a radical selected from the group consisting of hydrogen, α,α-dimethylbenzyl, α-methylbenzhydryl, triphenylmethyl, and α,α-p-trimethylbenzyl.

Typical chemicals useful in the practice of the present invention are as follows:

TYPE I

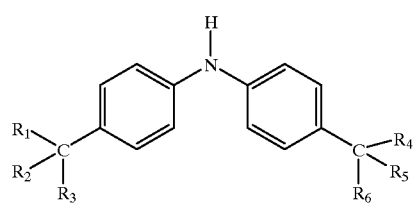

| $R_1$ | $R_2$ | $R_3$ | $R_4$ | $R_5$ | $R_6$ |
|---|---|---|---|---|---|
| Phenyl | Methyl | Methyl | Phenyl | Methyl | Methyl |
| Phenyl | Phenyl | Methyl | Phenyl | Phenyl | Methyl |
| Phenyl | Phenyl | Phenyl | Neopentyl | Methyl | Methyl |
| Methyl | Methyl | Methyl | p-Tolyl | Methyl | Methyl |

TYPE II

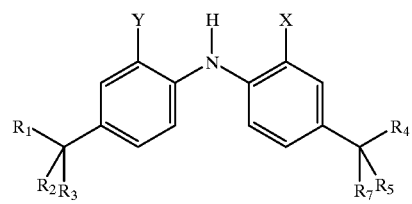

-continued

| $R_1$ | $R_2$ | $R_3$ | $R_4$ | $R_5$ | $R_7$ | X | Y |
|---|---|---|---|---|---|---|---|
| Phenyl | Methyl | Methyl | Phenyl | Methyl | Methyl | α,α-Dimethyl-benzyl | Hydrogen |
| Phenyl | Methyl | Methyl | Phenyl | Methyl | Methyl | Bromo | Bromo |
| Phenyl | Methyl | Methyl | Phenyl | Methyl | Methyl | Carboxyl | Hydrogen |
| Phenyl | Methyl | Methyl | Phenyl | Methyl | Methyl | Nickel carboxylate | Hydrogen |
| Phenyl | Methyl | Methyl | Phenyl | Methyl | Methyl | 2-Butyl | Hydrogen |
| Phenyl | Methyl | Methyl | Phenyl | Methyl | Methyl | 2-Octyl | Hydrogen |
| Phenyl | Phenyl | Phenyl | Phenyl | Phenyl | Phenyl | 2-Hexyl | Hydrogen |

TYPE III

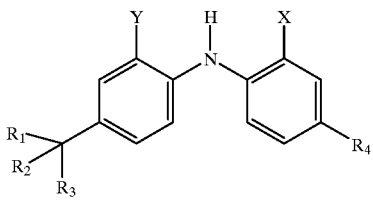

| $R_1$ | $R_2$ | $R_3$ | $R_4$ | X | Y |
|---|---|---|---|---|---|
| Phenyl | Methyl | Methyl | Isopropoxy | Hydrogen | Hydrogen |
| Phenyl | Methyl | Methyl | Hydrogen | 2-Octyl | Hydrogen |
| Phenyl | Phenyl | Phenyl | Hydrogen | 2-Hexyl | Hydrogen |

TYPE IV

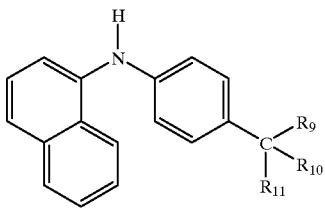

wherein $R_9$ is phenyl and $R_{10}$ and $R_{11}$ are methyl.

Of the foregoing preferred hydrocarbon-substituted diarylamines, the substituted diphenylamines of the formula:

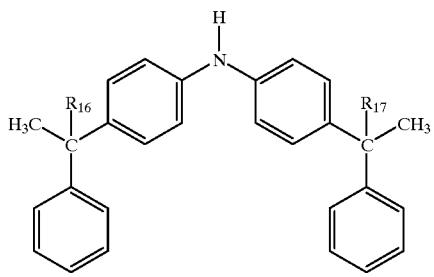

wherein $R_{16}$ and $R_{17}$ are methyl or phenyl are especially preferred. The compound wherein $R_{16}$ and $R_{17}$ are both methyl is 4,4'-bis(α,α-dimethylbenzyl)diphenylamine and the compound wherein $R_{16}$ and $R_{17}$ are both phenyl is 4,4'-bis(α-methylbenzyl)diphenylamine.

A second class of amine antioxidants useful in the practice of the present invention comprises the reaction products of a diarylamine and an aliphatic ketone. The diarylamine/aliphatic ketone reaction products that are useful herein are disclosed in U.S. Pat. Nos. 1,906,935; 1,975,167; 2,002,642; and 2,562,802. Briefly described, these products are obtained by reacting a diarylamine, preferably a diphenylamine, which may, if desired, possess one or more substituents on either or both aryl groups, with an aliphatic ketone, preferably acetone, in the presence of a suitable catalyst. In addition to diphenylamine, other suitable diarylamine reactants include substituted or unsubstituted dinaphthyl amine; p-nitrodiphenylamine; 2,4-dinitrodiphenylamine; p-aminodiphenylamine; p-hydroxydiphenylamine; and the like. In addition to acetone, other useful ketone reactants include methylethylketone, diethylketone, monochloroacetone, dichloroacetone, and the like.

The complex diarylamine-ketone reaction product with N,N'-diphenyl-para-phenylenediamine is commercially available as Flexamine® antioxidant, a product of Uniroyal Chemical Company, Inc. Flexamine® antioxidant is a blend of diarylamine-ketone reaction product (about 65 percent) and N,N'-diphenyl-para-phenylenediamine (about 35 percent), both percentages being based on weight. It is a superaging antioxidant that protects both natural and synthetic rubbers against deterioration from oxygen, heat, and flexing fatigue. Accordingly, it is especially recommended for use in heavy service truck treads and carcass compounds to combat the degrading effects of heat and mechanical flexing and for natural rubber wire insulation, linesmen's blankets and gloves, as well as other articles of manufacture that may come in contact with copper or manganese.

A preferred diarylamine-aliphatic ketone reaction product is obtained from the condensation reaction of diphenylamine and acetone (NAUGARD A, Uniroyal Chemical Company, Inc.) prepared, for example, in accordance with the conditions described in U.S. Pat. No. 2,562,802. The commercial product is supplied as a light tan-green powder or as greenish brown flakes and has a melting range of 85° to 95° C.

A third class of suitable amines useful in the practice of the present invention comprises the N,N' hydrocarbon substituted p-phenylenediamines. The hydrocarbon substituents may be alkyl or aryl groups, which can be substituted or unsubstituted. As used herein, the term "alkyl," unless specifically described otherwise, is intended to include cycloalkyl. Representative materials are:

N-phenyl-N'-cyclohexyl-p-phenylenediamine;
N-phenyl-N'-sec.-butyl-p-phenylenediamine;
N-phenyl-N'-isopropyl-p-phenylenediamine;
N-phenyl-N'-(1,3-dimethylbutyl)-p-phenylenediamine;
N,N'-bis-(1,4-dimethylpentyl)-p-phenylenediamine;
N,N'-diphenyl-p-phenylenediamine;
N,N'-di-beta naphthyl-p-phenylenediamine;
mixed diaryl-p-N,N'-bis-(1-ethyl-3-methylpentyl)-p-phenylenediamines; and
N,N'-bis-(1 methylheptyl)-p-phenylenediamine.

A final class of amine antioxidants useful in the practice of the present invention comprises materials based on quinoline, especially, polymerized 1,2-dihydro-2,2,4-trimethylquinoline. Representative materials include polymerized 2,2,4-trimethyl-1,2-dihydroquinoline; 6-dodecyl-2, 2,4-trimethyl-1,2-dihydroquinoline; 6-ethoxy-2,2,4-trimethyl-1-2-dihydroquinoline, and the like.

A preferred amine antioxidant is polymerized 1,2-dihydro-2,2,4-trimethyl quinoline, which is commercially available as Naugard Super Q® inhibitor, and can be purchased from Uniroyal Chemical Company, Inc., of Middlebury, Conn. It is an antioxidant/antiozonant type inhibitor, useful for such rubber compounds as butadiene rubber, nitrile-butadiene rubbers, natural rubbers, ethylene-propylene-diene rubbers, styrene-butadiene rubbers, and latexes. In rubber-use applications, where it is known to provide good protection against heat and attack from oxygen, it can be used in combination with conventional peroxide curing systems. Accordingly, in typical rubber-use applications, Naugard Super Q® inhibitor can be used in tire carcasses, wire breakers, and liner compounds.

A long-established and conventional use for polymerized 1,2-dihydro-2,2,4-trimethyl quinoline is as an additive for lubricants. In this regard, it serves as an antioxidant, in the sense that it prevents the oxidative breakdown of the oil in which it is incorporated.

One of the at least two components that can be used in the practice of the present invention can be a sterically hindered phenolic antioxidant. The hindered phenols that are useful in the practice of the present invention preferably have a molecular weight above 500 daltons. Preferred examples include:

2,4-dimethyl-6-octyl-phenol;
2,6-di-t-butyl-4-methyl phenol (i.e., butylated hydroxy toluene);
2,6-di-t-butyl-4-ethyl phenol; 2,6-di-t-butyl-4-n-butyl phenol;
2,2'-methylenebis(4-methyl-6-t-butyl phenol);
2,2'-methylenebis(4-ethyl-6-t-butyl-phenol);
2,4-dimethyl-6-t-butyl phenol;
4-hydroxymethyl-2,6-di-t-butyl phenol;
n-octadecyl-beta(3,5-di-t-butyl-4-hydroxyphenyl) propionate;
2,6-dioctadecyl-4-methyl phenol; 2,4,6-trimethyl phenol;
2,4,6-triisopropyl phenol;
2,4,6-tri-t-butyl phenol;
2-t-butyl-4,6-dimethyl phenol;
2,6-methyl-4-didodecyl phenol;
tris(3,5-di-t-butyl-4-hydroxy) isocyanurate; and
tris(2-methyl-4-hydroxy-5-t-butylphenyl)butane.

More preferred are:
octadecyl-3,5-di-t-butyl-4-hydroxy hydrocinnamate (NAUGARD 76, Uniroyal Chemical Company, Inc.; IRGANOX 1076, Ciba-Geigy);
tetrakis{methylene(3,5-di-t-butyl-4-hydroxyhydrocinnamate)}methane (NAUGARD 10, Uniroyal Chemical Company, Inc.; IRGANOX 1010, Ciba-Geigy);
1,2-bis(3,5-di-t-butyl-4-hydroxyhydrocinnamoyl)hydrazine (IRGANOX MD 1024,Ciba-Geigy);
1,3,5-tris(3,5-di-t-butyl-4-hydroxybenzyl)-s-triazine-2,4,6 (1H,3H,5H)trione (IRGANOX 3114,Ciba-Geigy);
2,2'-oxamido bis-{ethyl-3-(3,5-di-t-butyl-4-hydroxyphenyl)}propionate (NAUGARD XL-1, Uniroyal Chemical Company, Inc.);
1,3,5-tris(4-t-butyl-3-hydroxy-2,6-dimethylbenzyl)-s-triazine-2,4,6-(1H,3H,5H)trione (CYANOX 1790, American Cyanamid Co.);
1,3,5-trimethyl-2,4,6-tris(3,5-di-t-butyl-4-hydroxybenzyl) benzene (ETHANOX 330, Ethyl Corp.);
3,5-di-t-butyl-4-hydroxyhydrocinnamic acid triester with 1,3,5-tris(2-hydroxyethyl)-5-triazine-2,4,6(1H,3H,5H)-trione; and
bis(3,3-bis(4-hydroxy-3-t-butylphenyl)butanoic acid) glycolester.

Most preferred are hindered phenols having molecular weights above 700, especially polyphenols that contain three or more substituted phenol groups, such as tetrakis{methylene(3,5-di-t-butyl-4-hydroxyhydrocinnamate)}methane (IRGANOX 1010, Ciba-Geigy) and 1,3,5-trimethyl-2,4,6-tris(3,5-di-t-butyl-4-hydroxybenzyl)benzene (ETHANOX 330, Ethyl Corp.).

One conventional product, thiodiethylene bis-(3,5-di-tert-butyl-4-hydroxyhydrocinnamate), is currently in general use in connection with the stabilization of extended thermoplastic rubber and petroleum jelly/polyethylene for the wire and cable industry. It is commercially available from Ciba Geigy Corporation, under the Irganox® 1035 name and from Uniroyal Chemical Company, Inc., as Naugard® EL-50. This material is a high molecular weight, hindered phenolic antioxidant. Its recommended use is in connection with the stabilization of polymers and organic substrates that are susceptible to thermal-oxidative degradation. Further in this regard, the product literature states that this material is particularly effective for the stabilization of low-density polyethylene for wire and cable coating applications and emphasizes its processing stability, good color, and low volatility.

The preferred combinations of antioxidants for use in present invention are
(1) zinc dibutyl dithiocarbamate and polymerized 1,2-dihydro-2,2,4-trimethyl quinoline; and
(2) tetrakis{methylene(3,5-di-t-butyl-4-hydroxylhydrocinnamate)}methane and polymerized 1,2-dihydro-2,2,4-trimethyl quinoline.

Where there are two antioxidants, A and B, in the filler layer of the present invention they may be present in weight ratios ranging from 99:1 A:B to 1:99 A:B, preferably 75:25 A:B to 25:75 A:B, and, more preferably 50:50 A:B. Where there are more than two antioxidants in the filler layer, their optimum ratios can be readily determined by those skilled in the art without undue experimentation.

The filler layer typically comprises about 0.5% by weight antioxidant and 99.5 % "filler material." The total antioxidants of the present invention can range from a level of about 0.001 to about 10% by weight, preferably about 0.1 to about 2% by weight, more preferably, from about 0.2 to about 1% by weight and, most preferably, about 0.5% by weight.

The "filler material" used in the practice of the present invention is a mixture of hydrocarbon compounds that is semisolid at use temperatures. It is also known industrially as "cable filling compound." A typical requirement of cable filling compounds is that they have minimal leakage from the cut end of a cable at a 60° C. or higher temperature rating. Another typical requirement is that it resist water leakage through a short length of cut cable when water pressure is applied at one end. Among other typical requirements are cost competitiveness; minimal detrimental effect on signal transmission; minimal detrimental effect on the physical characteristics of the polymeric insulation and cable sheathing materials; thermal and oxidative stability; and cable fabrication processability.

Cable fabrication can be accomplished by heating the cable filling compound to a temperature of approximately 100° C., which liquefies it so that it can be pumped into the cable core to fully impregnate the interstices and eliminate all air space. Alternatively, thixotropic cable filling compounds using shear induced flow can be processed at reduced temperatures in the same manner. A cross section of a typical finished grease-filled cable transmission core is made up of about 52 percent insulated wire and about 48 percent interstices in terms of the areas of the total cross section. Since the interstices are completely filled with cable filling compound, a filled cable core typically contains about 48 percent by volume of cable filler.

The cable filling compound, or one or more of its hydrocarbon constituents, enters the insulation through absorption from the interstices. Generally, the insulation absorbs about 3 to about 30 parts by weight of cable filling compound or one or more of its hydrocarbon constituents, in toto, based on 100 parts by weight of polyolefin. A typical absorption is in the range of a total of about 5 to about 25 parts by weight per 100 parts by weight of insulation material, which is typically a polyolefin.

It will be appreciated by those skilled in the art that the combination of resin, cable filling compound constituents, and antioxidants in the insulation is more difficult to stabilize than an insulating layer containing only resin and antioxidant, and no cable filling compound constituent.

Examples of filler material (cable filling compound) are petrolatum; petrolatum/polyolefin wax mixtures; oil modified thermoplastic rubber (ETPR or extended thermoplastic rubber); paraffin oil; naphthenic oil; mineral oil; the aforementioned oils thickened with a residual oil, petrolatum, or wax; polyethylene wax; mineral oil/rubber block copolymer mixture; lubricating grease; and various mixtures thereof, all of which meet industrial requirements similar to those typified above.

A preferred filler material comprises extended thermoplastic rubber (ETPR) and petroleum jelly/polyethylene.

Typically, the filler comprises 90 percent or more by weight petrolatum (petroleum jelly), about 5 to 7 percent polybutene-1, about 0.5 to 2.0 percent polyethylene, the remainder of the filler comprising a non-greasy, strippable extended thermoplastic rubber or an amorphous saturated rubber such as ethylene/propylene rubber (EPR).

Generally, cable filling compounds extract insulation and/or jacket antioxidants and are absorbed into the polymeric insulation. Since each cable filling compound contains several hydrocarbons, both the absorption and the extraction behavior are preferential toward the lower molecular weight hydrocarbon wax and oil constituents. The insulation composition with its antioxidant not only has to resist extraction, but has to provide sufficient stabilization (i) to mediate against the copper conductor, which is a potential catalyst for insulation oxidative degradation, (ii) to counter the effect of residuals of chemical blowing agents present in cellular and cellular/solid (foam/skin) polymeric foamed insulation; and (iii) to counter the effect of absorbed constituents from the cable filling compound.

The jacket and insulation compositions employed in the practice of the present invention typically comprise at least one cross-linkable thermoplastic polyolefin, usually containing carbon black, and, generally, coats of low density polyolefin (LDPE), linear low density polyolefin (LLDPE), or high density polyolefin (HDPE) and one or more stabilizers.

The polyolefins can be homopolymers or copolymers produced from two or more comonomers, or a blend of two or more of these polymers, conventionally used in film, sheet, and tubing, and as jacketing and/or insulating materials in wire and cable applications.

The monomers of these homopolymers and copolymers can have 2 to 20 carbon atoms, preferably 2 to 12 carbon atoms. Examples include α-olefins, such as, ethylene, propylene, 1-butene, 1-hexene, 4-methyl-1-pentene, 1-octene, and the like; unsaturated esters, such as, vinyl acetate, ethyl acrylate, methyl acrylate, methyl methacrylate, t-butyl acrylate, n-butyl acrylate, n-butyl methacrylate, 2-ethylhexyl acrylate, and the like; diolefins, such as, 1,4-pentadiene, 1,3-hexadiene, 1,5-hexadiene, 1,4-octadiene, ethylidene norbornene—commonly the third monomer in a terpolymer—and the like; other monomers, such as, styrene, p-methyl styrene, α-methyl styrene, p-chloro styrene, vinyl naphthalene, and similar aryl olefins; nitriles, such as, acrylonitrile, methacrylonitrile, α-chloroacrylonitrile, and the like; vinyl methyl ketone, vinyl methyl ether, vinylidene chloride, maleic anhydride, vinyl chloride, tetrafluoroethylene, chlorotrifluoroethylene, and the like; and acrylic acid, methacrylic acid, and the like.

The homopolymers and copolymers can, if desired, be halogenated in a conventional manner, generally with chlorine or bromine. Examples of halogenated polymers are polyvinyl chloride, polyvinylidene chloride, polytetrafluoroethylene, and the like. The homopolymers and copolymers of ethylene and propylene are preferred, either with or without halogenation. Included in this preferred group are terpolymers, such as, ethylene/propylene/diene monomer rubbers. The homopolymers or copolymers of ethylene wherein ethylene is the primary comonomer and the homopolymers or copolymers of propylene wherein propylene is the primary comonomer may be referred to herein as polyethylene and polypropylene, respectively.

Other examples of ethylene polymers include a high pressure homopolymer of 20 ethylene; a copolymer of ethylene and at least one $C_3$–$C_{12}$ α-olefin; a homopolymer or copolymer of ethylene having a hydrolyzable silane grafted to its backbone; a copolymer of ethylene and a hydrolyzable silane; or a copolymer of a $C_2$–$C_{12}$ α-olefin and a $C_4$–$C_{20}$ unsaturated ester, e.g., an ethylene/ethyl acrylate or vinyl acetate copolymer; an ethylene/ethyl acrylate or vinyl acetate/hydrolyzable silane terpolymer; or an ethylene/ethyl acrylate or vinyl acetate copolymer having a hydrolyzable silane grafted to its backbone.

Homopolymers or copolymers of propylene with at least one other α-olefin, wherein the portion of the copolymer based on propylene is at least about 60% by weight based on the weight of the copolymer, can also be used as the polyolefin employed in the practice of this invention. Conventional processes can be used for their preparation, such as, the process described in U.S. Pat. No. 4,414,132, hereby incorporated herein by reference. The α-olefins in the copolymer are preferably those having either 2 or from 4 to 12 carbon atoms.

The cross-linkable thermoplastic polyolefins used in the practice of the present invention can be cross-linked with a free radical generator, such as, an organic peroxide, or, to make them hydrolyzable, they can be grafted with an alkenyl trialkoxy silane in the presence of such a peroxide. Useful alkenyl trialkoxy silanes include the vinyl trialkoxy silanes, such as, vinyl trimethoxy silane, vinyl triethoxy silane, and vinyl triisopropoxy silane. The alkenyl and alkoxy radicals can have 1 to 30 carbon atoms and, preferably, have 1 to 12 carbon atoms. The hydrolyzable polymers can be cured with moisture in the presence of a conventional silanol condensation catalyst, such as, dibutyltin dilaurate, dioctyl tin maleate, stannous acetate, stannous octoate, and the like.

The polyethylenes can have a density in the range of about 0.850 to about 0.970 gram per cubic centimeter. The density is preferably in the range of about 0.925 to about 0.970 gram per cubic centimeter. Medium and high density polyethylenes are preferred.

These polymers may also, if desired, be foamed, and may be either open celled or closed celled. Foamed polymers may or may not have skins, as desired.

The stabilizers of the present invention were tested and compared to other stabilizer compositions in connection with extended thermal plastic rubbers, specifically, Witcogel® II and Witcogel® II-LV extended thermal plastic rubbers. These materials are non-greasy, fully strippable ETPR compounds and are commercially available from the Witco Corporation.

The following examples and comparative examples describe tests, run at temperatures of 190° C. and 220° C., for Oxidative Induction Time (OIT), in accordance with procedures set forth in American Society of Testing Materials (ASTM) D 3895-94, noting the time, in minutes, for the onset of degradation of the wire/cable filler. These examples are set forth to describe more particularly to those skilled in the art the principles and practice of the present invention. As such, these examples are not intended to limit the invention but, rather, are merely illustrative of certain aspects of various preferred embodiments.

EXAMPLES

Sample preparation was as follows. Cable filling compounds were weighed out, according to formula, into a 16-ounce jar. Antioxidants to be investigated were weighed out, in accordance with known laboratory procedures, to achieve the tabulated (desired) weight percentages and set aside. Each such jar was then heated on a hot plate until the cable filling compound started to soften. The material was stirred frequently, by hand.

When the cable filling compound was sufficiently melted, the mixture was stirred with an electric stirrer on a hot plate until the temperature of the mixture reached 110° C. The mixture was scraped down from the sides of the jar to ensure thorough mixing and stirred at this temperature until uniform, about two to five minutes. The mixture was then removed from the hot plate and stirred by hand until the cable filling compound cooled and returned to its original consistency.

If any particular antioxidant additive did not dissolve readily in the cable filling compound, the following procedure was employed. Such an additive was (or the several additives together were) dissolved in a minimal amount of acetone. The amount used was the minimum needed to dissolve the additive(s) completely. The resultant mixture was then stirred into the cable filling compound. Upon heating, the acetone was carefully boiled off, while the mixture was stirred by hand.

In determining Oxidation-Induction Time (OIT), testing procedure ASTM D 3895-94 was employed. In accordance with the procedures set forth in this standard, a sample weighing between three and five milligrams was obtained, placed in a standard 40 microliter aluminum crucible, and covered with a perforated lid. Then:

(1) The sample was heated at 20° C./minute from a temperature of 70° C. to 190° C. under a 50 mL/min nitrogen flow.

(2) The sample was allowed to equilibrate for two minutes at 190° C. or 220° C.

(3) The nitrogen was then turned off and the oxygen flow started at a rate of 50 mL/min. This is considered time zero in calculating OIT.

(4) The sample was allowed to degrade under oxygen.

(5) The onset of degradation was found, and the OIT value, in minutes, was calculated.

The resulting OIT values are presented in Tables I, II, and III. The unexpectedly long OIT values for the stabilizers of the present invention can be determined from a comparison of the values presented in the tables.

In the tables, the results of the ASTM D 3895-94 test are presented in minutes until the occurrence of oxidative breakdown.

TABLE I

Interactions of Dithiocarbamates and Amines (also Amine and Amine Interactions)

| Antioxidant 1 | Antioxidant 2 | Concentration (Weight %) | OIT, 190° C. | OIT, 220° C. |
|---|---|---|---|---|
| Irganox 1035 | — | 0.5 | 75 | — |
| Flexzone 7 | — | 0.5 | 8 | — |
| Octamine | — | 0.5 | 10 | — |
| Naugard 445 | — | 0.5 | 6 | — |
| Naugard A | — | 0.5 | 15 | — |
| Naugard SA | — | 0.5 | 100 | — |
| Naugard Super Q | — | 0.5 | 10 | — |
| Flexamine | — | 0.5 | 70 | — |
| Butazate | — | 0.5 | 450 | 35 |
| Arazate | — | 0.50 | 200 | — |
| Naugard Super Q | Butazate | 0.25, 0.25 | 500 | 45 |
| Flexamine | Butazate | 0.25, 0.25 | 450 | 55 |
| Flexzone 7 | Butazate | 0.25, 0.25 | 527 | — |
| Octamine | Butazate | 0.25, 0.25 | 517 | — |
| Naugard 445 | Butazate | 0.25, 0.25 | 544 | — |
| Naugard A | Butazate | 0.25, 0.25 | 503 | — |
| Naugard SA | Butazate | 0.25, 0.25 | 529 | — |
| Naugar Super Q | Arazate | 0.25, 0.25 | 360 | — |
| Flexamine | Arazate | 0.25, 0.25 | 355 | — |
| Flexzone 7 | Arazate | 0.25, 0.25 | 320 | — |
| Naugard Super Q | Naugard A | 0.25, 0.25 | 15 | — |
| Naugard Super Q | Naugard 445 | 0.25, 0.25 | 20 | — |
| Naugard Super Q | Naugard SA | 0.25, 0.25 | 110 | — |
| Naugard 445 | Naugard A | 0.25, 0.25 | 20 | — |
| Naugard 445 | Naugard SA | 0.25, 0.25 | 110 | — |
| Irganox 1035 | — | 1 | 360 | — |
| Butazate | — | 1 | >800 | 165 |

TABLE I-continued

Interactions of Dithiocarbamates and Amines (also Amine and Amine Interactions)

| Antioxidant 1 | Antioxidant 2 | Concentration (Weight %) | OIT, 190° C. | OIT, 220° C. |
|---|---|---|---|---|
| Arazate | — | 1 | 340 | — |
| Naugard Super Q | Butazate | 0.50, 0.50 | >800 | 205 |
| Flexamine | Butazate | 0.50, 0.50 | 580 | 100 |
| Naugard Super Q | Butazate | 1.00, 1.00 | — | 220 |

TABLE II

Interactions of Amines and Phenolics

| Antioxidant 1 | Antioxidant 2 | Concentration (Weight %) | OIT, 190° C. | OIT, 220° C. |
|---|---|---|---|---|
| Irganox 1035 | — | 0.50 | 75 | — |
| Flexzone 7 | — | 0.50 | 8 | — |
| Octamine | — | 0.50 | 10 | — |
| Naugard 445 | — | 0.50 | 6 | — |
| Naugard A | — | 0.50 | 15 | — |
| Naugard SA | — | 0.50 | 100 | — |
| Naugard Super Q | — | 0.50 | 10 | — |
| Flexamine | — | 0.50 | 70 | — |
| Naugard 10 | — | 0.50 | 40 | — |
| Naugard 76 | — | 0.50 | 10 | — |
| Naugard XL-1 | — | 0.50 | 45 | — |
| Naugard 431 | — | 0.50 | 10 | — |
| Flexzone 7 | Naugard 10 | 0.25, 0.25 | 265 | 40 |
| Naugard 445 | Naugard 10 | 0.25, 0.25 | 230 | 20 |
| Naugard Super Q | Naugard 10 | 0.25, 0.25 | 235 | — |
| Naugard SA | Naugard 10 | 0.25, 0.25 | 185 | 15 |
| Flexzone 7 | Naugard XL-1 | 0.25, 0.25 | 210 | 30 |
| Naugard 445 | Naugard XL-1 | 0.25, 0.25 | 50 | — |
| Naugard Super Q | Naugard XL-1 | 0.25, 0.25 | 180 | — |
| Naugard SA | Naugard XL-1 | 0.25, 0.25 | 110 | — |
| Irganox 1035 | — | 1.00 | 360 | — |
| Flexzone 7 | Naugard 10 | 0.50, 0.50 | 305 | 45 |
| Naugard 445 | Naugard 10 | 0.50, 0.50 | 160 | 15 |
| Naugard Super Q | Naugard 10 | 0.50, 0.50 | 290 | 50 |
| Naugard SA | Naugard 10 | 0.50, 0.50 | 520 | 50 |
| Flexzone 7 | Naugard XL-1 | 0.50, 0.50 | 240 | 45 |

TABLE III

Interactions of Dithiocarbamates and Phenolics

| Antioxidant 1 | Antioxidant 2 | Concentration (Weight %) | OIT, 190° C. | OIT, 220° C. |
|---|---|---|---|---|
| Naugard 10 | — | 0.50 | 40 | — |
| Naugard XL-1 | — | 0.50 | 45 | — |
| Butazate | — | 0.50 | 450 | 35 |
| Butazate | Naugard 10 | 0.25, 0.25 | 390 | — |
| Butazate | Naugard XL-1 | 0.25, 0.25 | 440 | — |

Footnotes to Tables I, II, and III:
(1) The OIT value presented, at the noted temperature, is in minutes.
(2) Irganox 1035 is thiodiethylene bis-(3,5-di-t-butyl-4-hydroxyhydrocinnamate), available from Ciba Geigy Corporation.
(3) Flexzone 7 is N-1,3-dimethyl-N'-phenyl-p-phenylenediamine, available from Uniroyal Chemical Company, Inc.
(4) Octamine is octylated diphenylamine, available from Uniroyal Chemical Company, Inc.
(5) Naugard 445 is 4,4'-bis($\alpha,\alpha$-dimethylbenzyl)diphenylamine, available from Uniroyal Chemical Company, Inc.
(6) Naugard A is a diphenylamine/acetone reaction product, available from Uniroyal Chemical Company, Inc.
(7) Naugard SA is p-(p-toluenesulfonamido)-diphenylamine, available from Uniroyal Chemical Company, Inc.
(8) Naugard Super Q is polymerized 1,2-dihydro-2,2,4-trimethyl quinoline, available from Uniroyal Chemical Company, Inc.
(9) Flexamine is a complex diarylamine-ketone reaction product with N,N'-diphenyl-para-phenylene diamine, available from Uniroyal Chemical Company, Inc.
(10) Butazate is a zinc dithiocarbamate salt (wherein R and $R_1$ are butyl), available from Uniroyal Chemical Company, Inc.
(11) Arazate is a zinc dithiocarbamate salt (wherein R and $R_1$ are phenyl), available from Uniroyal Chemical Company, Inc.
(12) Naugard 10 is tetrakis{methylene(3,5-di-t-butyl-4-hydroxylhydrocinnamate)}methane, available from Uniroyal Chemical Company, Inc.
(13) Naugard 76 is octadecyl 3,5-di-t-butyl-4-hydroxyhydrocinnamate, available from Uniroyal Chemical Company, Inc.
(14) Naugard XL-1 is 2,2'-oxamido bis-{ethyl-3-(3,5-di-t-butyl-4-hydroxyphenyl)propionate}, available from Uniroyal Chemical Company, Inc.
(15) Naugard 431 is a mixture of mono- and di-styrenated-p-cresols, available from Uniroyal Chemical Company, Inc.

While the present invention has been described with reference to preferred embodiments, alternatives and equivalents will become apparent to those skilled in the art upon reading the foregoing description. For example, the term "cable" is to be interpreted broadly, so as to include wire, and vice versa. Accordingly, such alternatives and equivalents are intended to form a part of this invention insofar as they fall within the spirit and scope of the accompanying claims.

What is claimed is:

1. In a wire or cable system comprising a wire or cable portion, an insulation composition surrounding the wire or cable portion, a filler material surrounding the insulation composition and a jacket composition surrounding the filler material wherein either the insulation composition, the jacket composition, or both comprise at least one antioxidant, the improvement that comprises the inclusion in the filler material of from about 0.2 to about 1% by weight of a stabilizing mixture comprising at least two antioxidants, each of the two antioxidants being selected from different members of the three-membered group consisting of:

(a) metal dithiocarbamate salts, (b) amine antioxidants selected from the group consisting of
  (1) hydrocarbon-substituted diarylamines of the general formula

where Ar and Ar' are independently selected aryl radicals,
  (2) reaction products of a diarylamine and an aliphatic ketone,
  (3) N,N' hydrocarbon substituted p-phenylenediamine, and
  (4) 1,2-dihydroquinoline compound, and (c) sterically hindered phenolic antioxidants, wherein the stabilizing mixture is present in the filler material in an amount that is effective for the reduction of the oxidation of the cable filling material and for producing an oxidative induction time, as measured by ASTM D 3895-94 at 190° C., in excess of 100 minutes, whereby deterioration of the jacket and/or insulation is reduced.

2. The wire or cable system of claim 1 wherein the metal dithiocarbamate salt is of the structure

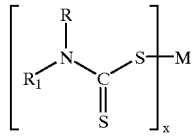

wherein
M is a divalent, trivalent, or tetravalent metal,
X is an integer of from 2 to 4 that equals the valence of M, and the moiety

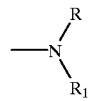

is the residue of any secondary amine that will react with carbon disulfide to form a dithiocarbamate.

3. The wire or cable system of claim 2 wherein the total number of carbon atoms in the groups R and R' is 48 or less.

4. The wire or cable system of claim 3 wherein R and R' are independently selected from the group consisting of phenyl, naphthyl, methyl, ethyl, propyl, butyl, pentyl, hexyl, heptyl, octyl, cyclopentyl, cyclohexyl, benzyl, phenethyl, and structural isomers thereof.

5. The wire or cable system of claim 2 wherein the amine nitrogen is included in a morpholino, thiamorpholino, or piperidino group.

6. The wire or cable system of claim 2 wherein M is selected from the group consisting of the divalent metals copper, zinc, manganese, nickel, lead, cadmium, cobalt, tin(II), barium, and mercury, the trivalent metals iron(III) and bismuth, and the tetravalent metal tin(IV).

7. The wire or cable system of claim 6 wherein M is a divalent metal.

8. The wire or cable system of claim 7 wherein M is zinc.

9. The wire or cable system of claim 8 wherein R and $R_1$ are butyl.

10. The wire or cable system of claim 8 wherein R and $R_1$ are phenyl.

11. The wire or cable system of claim 1 wherein the amine antioxidant is a hydrocarbon-substituted diarylamine of the general formula

wherein Ar and Ar' are independently selected aryl radicals.

12. The wire or cable system of claim 11 wherein at least one of the aryl radicals is substituted with at least one alkyl radical.

13. The wire or cable system of claim 11 wherein hydrocarbon-substituted diarylamine is represented by the general formula:

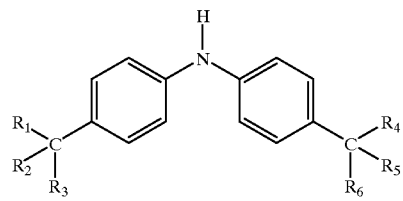

wherein $R_1$ is a radical selected from the group consisting of phenyl and p-tolyl;

$R_2$ and $R_3$ are radicals independently selected from the group consisting of methyl, phenyl, and p-tolyl;

$R_4$ is a radical selected from the group consisting of methyl, phenyl, p-tolyl, and neopentyl;

$R_5$ is a radical selected from the group consisting of methyl, phenyl, p-tolyl, and 2-phenylisobutyl; and, $R_6$ is a methyl radical.

14. The wire or cable system of claim 11 wherein hydrocarbon-substituted diarylamine is represented by the general formula:

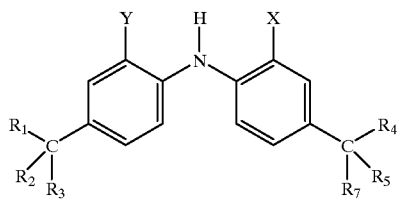

(II)

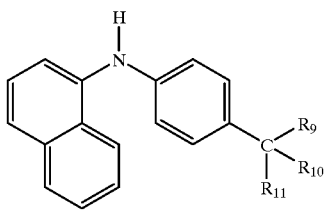

(IV)

wherein

R₁ is a radical selected from the group consisting of phenyl and p-tolyl;

R₂ and R₃ are radicals independently selected from the group consisting of methyl, phenyl, and p-tolyl;

R₄ is a radical selected from the group consisting of methyl, phenyl, p-tolyl, and neopentyl;

R₅ is a radical selected from the group consisting of methyl, phenyl, p-tolyl, and 2-phenylisobutyl;

R₇ is a radical selected from the group consisting of methyl, phenyl, and p-tolyl;

X is a radical selected from the group consisting of methyl, ethyl, $C_3$–$C_{10}$ sec-alkyl, α,α-dimethylbenzyl, α-methylbenzyl, chlorine, bromine, carboxyl, and metal salts of the carboxylic acids where the metal is selected from the group consisting of zinc, cadmium, nickel, lead, tin, magnesium, and copper; and, Y is a radical selected from the group consisting of hydrogen, methyl, ethyl, $C_3$–$C_{10}$ sec-alkyl, chlorine, and bromine.

15. The wire or cable system of claim 11 wherein hydrocarbon-substituted diarylamine is represented by the general formula:

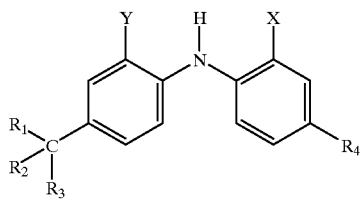

(III)

wherein

R₁ is a radical selected from the group consisting of phenyl or p-tolyl;

R₂ and R₃ are radicals independently selected from the group consisting of methyl, phenyl, and p-tolyl;

R₄ is a radical selected from the group consisting of hydrogen, $C_3$–$C_{10}$ primary, secondary, and tertiary alkyl, and $C_3$–$C_{10}$ alkoxyl, which may be straight chain or branched; and X and Y are radicals selected from the group consisting hydrogen, methyl, ethyl, $C_3$–$C_{10}$ sec-alkyl, chlorine, and bromine.

16. The wire or cable system of claim 11 wherein hydrocarbon-substituted diarylamine is represented by the general formula:

wherein

R₉ is a radical selected from the group consisting of methyl, phenyl, and p-tolyl;

R₁₀ is a radical selected from the group consisting of methyl, phenyl, p-tolyl and 2-phenyl isobutyl; and R₁₁ is a radical selected from the group consisting methyl, phenyl, and p-tolyl.

17. The wire or cable system of claim 11 wherein hydrocarbon-substituted diarylamine is represented by the general formula:

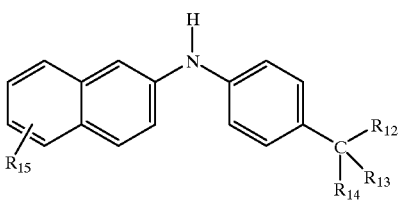

(V)

wherein

R₁₂ is a radical selected from the group consisting of methyl, phenyl, and p-tolyl;

R₁₃ is a radical selected from the group consisting of methyl, phenyl, and p-tolyl;

R₁₄ is a radical selected from the group consisting of methyl, phenyl, p-tolyl, and 2-phenylisobutyl; and R₁₅ is a radical selected from the group consisting of hydrogen, α,α-dimethylbenzyl, α-methylbenzhydryl, triphenylmethyl, and α,α-p-trimethylbenzyl.

18. The wire or cable system of claim 1 wherein the amine antioxidant is a reaction product of a diarylamine and an aliphatic ketone.

19. The wire or cable system of claim 18 wherein the diarylamine is selected from the group consisting of substituted or unsubstituted diphenylamine; substituted or unsubstituted dinaphthylamine; p-nitrodiphenylamine; 2,4-dinitrodiphenylamine; p-aminodiphenylamine; and p-hydroxydiphenylamine.

20. The wire or cable system of claim 19 wherein the diarylamine is substituted or unsubstituted diphenylamine.

21. The wire or cable system of claim 18 wherein the aliphatic ketone is selected from the group consisting of acetone, methylethylketone, diethylketone, monochloroacetone, and dichloroacetone.

22. The wire or cable system of claim 21 wherein the aliphatic ketone is acetone.

23. The wire or cable system of claim 22 wherein the diarylamine is diphenylamine.

24. The wire or cable system of claim 1 wherein the amine antioxidant is an N,N' hydrocarbon substituted p-phenylenediamine.

25. The wire or cable system of claim 24 wherein the hydrocarbon substituents are substituted or unsubstituted alkyl or aryl groups.

26. The wire or cable system of claim 24 wherein the N,N' hydrocarbon substituted p-phenylenediamine is selected from the group consisting of:
N-phenyl-N'-cyclohexyl-p-phenylenediamine;
N-phenyl-N'-sec.-butyl-p-phenylenediamine;
N-phenyl-N'-isopropyl-p-phenylenediamine;
N-phenyl-N'-(1,3-dimethylbutyl)-p-phenylenediamine;
N,N'-bis-(1,4-dimethylpentyl)-p-phenylenediamine;
N,N'-diphenyl-p-phenylenediamine;
N,N'-di-beta naphthyl-p-phenylenediamine;
mixed diaryl-p-N,N'-bis-(1-ethyl-3-methylpentyl)-p-phenylenediamines; and
N,N'-bis-(1 methylheptyl)-p-phenylenediamine.

27. The wire or cable system of claim 1 wherein the amine antioxidant comprises 1,2-dihydroquinoline compound.

28. The wire or cable system of claim 27 wherein the 1,2-dihydroquinoline compound is selected from the group consisting of polymerized 1,2-dihydro-2,2,4-trimethylquinoline; 2,2,4-trimethyl-1,2-dihydroquinoline; 6-dodecyl-2,2,4-trimethyl-1,2-dihydroquinoline; and 6-ethoxy-2,2,4-trimethyl-1-2-dihydroquinoline.

29. The wire or cable system of claim 1 wherein the amine antioxidant is polymerized 1,2-dihydro-2,2,4-trimethyl quinoline.

30. The wire or cable system of claim 1 wherein the hindered phenolic antioxidant has a molecular weight above 500 daltons.

31. The wire or cable system of claim 30 wherein the hindered phenolic antioxidant is selected from the group consisting of:
2,4-dimethyl-6-octyl-phenol;
2,6-di-t-butyl-4-methyl phenol;
2,6-di-t-butyl-4-ethyl phenol;
2,6-di-t-butyl-4-n-butyl phenol;
2,2'-methylenebis(4-methyl-6-t-butyl phenol);
2,2'-methylenebis(4-ethyl-6-t-butyl-phenol);
2,4-dimethyl-6-t-butyl phenol;
4-hydroxymethyl-2,6-di-t-butyl phenol;
n-octadecyl-beta(3,5-di-t-butyl-4-hydroxyphenyl) propionate;
2,6-dioctadecyl-4-methyl phenol;
2,4,6-trimethyl phenol;
2,4,6-triisopropyl phenol;
2,4,6-tri-t-butyl phenol;
2-t-butyl-4,6-dimethyl phenol;
2,6-methyl-4-didodecyl phenol;
tris(3,5-di-t-butyl-4-hydroxy)isocyanurate;
tris(2-methyl-4-hydroxy-5-t-butylphenyl)butane;
octadecyl-3,5-di-t-butyl-4-hydroxy hydrocinnamate;
tetrakis{methylene(3,5-di-t-butyl-4-hydroxyhydrocinnamate)}methane;
1,2-bis(3,5-di-t-butyl-4-hydroxyhydrocinnamoyl) hydrazine;
1,3,5-tris(3,5-di-t-butyl-4-hydroxybenzyl)-s-triazine-2,4,6 (1H,3H,5H)trione;
2,2'-oxamido bis-{ethyl-3-(3,5-di-t-butyl-4-hydroxyphenyl)}propionate;
1,3,5-tris(4-t-butyl-3-hydroxy-2,6-dimethylbenzyl)-s-triazine-2,4,6-(1H,3H,5H)trione;
1,3,5-trimethyl-2,4,6-tris(3,5-di-t-butyl-4-hydroxybenzyl) benzene;
3,5-di-t-butyl-4-hydroxyhydrocinnamic acid triester with 1,3,5-tris(2-hydroxyethyl)-5-triazine-2,4,6(1H,3H,5H)-trione; and
bis(3,3-bis(4-hydroxy-3-t-butylphenyl)butanoic acid) glycolester.

32. The wire or cable system of claim 1 wherein the hindered phenolic antioxidant has a molecular weight above 700 daltons.

33. The wire or cable system of claim 32 wherein the hindered phenolic antioxidant is a polyphenol comprising three or more substituted phenol groups.

34. The wire or cable system of claim 33 wherein the polyphenol comprising three or more substituted phenol groups is selected from the group consisting of tetrakis{methylene(3,5-di-t-butyl-4-hydroxy-hydrocinnamate)}methane and 1,3,5-trimethyl-2,4,6-tris(3, 5-di-t-butyl-4-hydroxybenzyl)benzene.

35. The wire or cable system of claim 1 wherein the phenolic antioxidant is tetrakis[methylene(3,5-di-tert-butyl-4-hydroxy-hydrocinnamate)]methane.

* * * * *